(12) United States Patent
Farooq et al.

(10) Patent No.: US 9,821,759 B2
(45) Date of Patent: Nov. 21, 2017

(54) SEAT-BELT MOUNTING SYSTEM

(71) Applicant: Ford Global Technologies, LLC, Dearborn, MI (US)

(72) Inventors: Iskander Farooq, Novi, MI (US); Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/639,273

(22) Filed: Mar. 5, 2015

(65) Prior Publication Data

US 2016/0257284 A1  Sep. 8, 2016

(51) Int. Cl.
*B60R 22/28* (2006.01)
*B60R 22/24* (2006.01)
*B60R 22/185* (2006.01)
*B60R 22/18* (2006.01)

(52) U.S. Cl.
CPC ............ *B60R 22/28* (2013.01); *B60R 22/185* (2013.01); *B60R 22/24* (2013.01); *B60R 2022/1818* (2013.01); *B60R 2022/283* (2013.01); *B60R 2022/286* (2013.01)

(58) Field of Classification Search
CPC ..... B60R 22/18; B60R 22/202; B60R 22/203; B60R 22/28; B60R 22/38; B60R 22/42; B60R 2022/1818; B60R 2022/1831; B60R 2022/283; B60R 2022/286; B60R 2022/3475; B60R 22/185
See application file for complete search history.

(56) References Cited

U.S. PATENT DOCUMENTS

| 3,692,253 | A | * | 9/1972 | Curran | B60R 22/353 |
| | | | | | 242/381.4 |
| 4,327,881 | A | * | 5/1982 | Fohl | B60R 22/1855 |
| | | | | | 242/381.4 |
| 4,485,985 | A | * | 12/1984 | Fohl | B60R 22/42 |
| | | | | | 242/381.4 |
| 4,494,774 | A | * | 1/1985 | Fohl | B60R 22/1855 |
| | | | | | 242/381.4 |
| 4,717,088 | A | * | 1/1988 | Fohl | B60R 22/1855 |
| | | | | | 24/170 |
| 5,137,226 | A | * | 8/1992 | Fujimura | B60R 22/42 |
| | | | | | 242/377 |
| 5,415,432 | A | * | 5/1995 | Thomas | B60R 22/24 |
| | | | | | 280/808 |
| 5,415,433 | A | * | 5/1995 | Pfeiffer | B60R 22/24 |
| | | | | | 242/377 |
| 5,558,294 | A | * | 9/1996 | Sasaki | B60R 22/34 |
| | | | | | 242/377 |

(Continued)

FOREIGN PATENT DOCUMENTS

DE    GB 2521769 A * 7/2015 ............. B60R 22/18

*Primary Examiner* — Barry Gooden, Jr.
(74) *Attorney, Agent, or Firm* — Frank A. MacKenzie; Bejin Bieneman PLC

(57) ABSTRACT

An apparatus includes a mounting plate having at least one deformable opening arranged to receive a securing member. The opening is configured to deform when a load on the mounting plate exceeds a predetermined threshold. The apparatus includes a ring member connected to the mounting plate. The ring member includes an opening to receive a strap there-through.

20 Claims, 9 Drawing Sheets

(56) References Cited

U.S. PATENT DOCUMENTS

| | | | | |
|---|---|---|---|---|
| 5,580,091 A * | 12/1996 | Doty | ............... | B60R 22/341 |
| | | | | 188/371 |
| 5,673,936 A * | 10/1997 | Mondel | ............... | B60R 22/24 |
| | | | | 280/808 |
| 5,743,563 A * | 4/1998 | Juchem | ............... | B60R 22/42 |
| | | | | 280/806 |
| 6,056,320 A * | 5/2000 | Khalifa | ............... | B60R 22/28 |
| | | | | 280/805 |
| 6,113,146 A * | 9/2000 | Mautsch | ............... | B60R 22/24 |
| | | | | 280/808 |
| 6,170,876 B1 * | 1/2001 | Mautsch | ............... | B60R 22/24 |
| | | | | 280/806 |
| 6,749,150 B2 | 6/2004 | Kohlndorfer et al. | | |
| 6,860,671 B2 | 3/2005 | Schulz | | |
| 6,877,189 B2 * | 4/2005 | Simonson | ............... | B60P 7/083 |
| | | | | 24/163 R |
| 6,913,288 B2 * | 7/2005 | Schulz | ............... | B60R 22/28 |
| | | | | 188/371 |
| 6,938,925 B2 | 9/2005 | Mather | | |
| 7,185,919 B2 | 3/2007 | Mather et al. | | |
| 7,458,610 B2 * | 12/2008 | Park | ............... | B60R 22/24 |
| | | | | 280/801.1 |
| 8,393,645 B2 * | 3/2013 | Wiseman | ............... | B60R 22/19 |
| | | | | 24/171 |
| 8,641,096 B1 | 2/2014 | Kohlndorfer | | |
| 8,793,844 B2 | 8/2014 | McFalls et al. | | |
| 9,168,890 B1 * | 10/2015 | Jaradi | ............... | B60R 22/36 |
| 2002/0043830 A1 * | 4/2002 | Sawamoto | ............... | B60N 2/2809 |
| | | | | 297/216.11 |
| 2002/0130506 A1 * | 9/2002 | Knych | ............... | B60R 22/1951 |
| | | | | 280/801.1 |
| 2005/0012318 A1 * | 1/2005 | Schulz | ............... | B60R 22/28 |
| | | | | 280/805 |
| 2007/0069060 A1 * | 3/2007 | Maciejczyk | ............... | B60R 22/347 |
| | | | | 242/381.1 |
| 2014/0070596 A1 * | 3/2014 | Tabata | ............... | B60R 22/18 |
| | | | | 297/474 |

* cited by examiner ent systems in vehicles typically include three-point seat belt systems. Three-point seat belt systems often use a webbing slidably anchored to structural parts of the vehicle, e.g., a pillar, a seat frame, and a vehicle floor. Vehicle seat belt systems further typically include a pretensioner and other load limiting mechanisms to control forward motion of an occupant during a crash event. However, the pretensioner adds cost and complexity to the seat belt system.

DETAILED DESCRIPTION

Figure 1A:
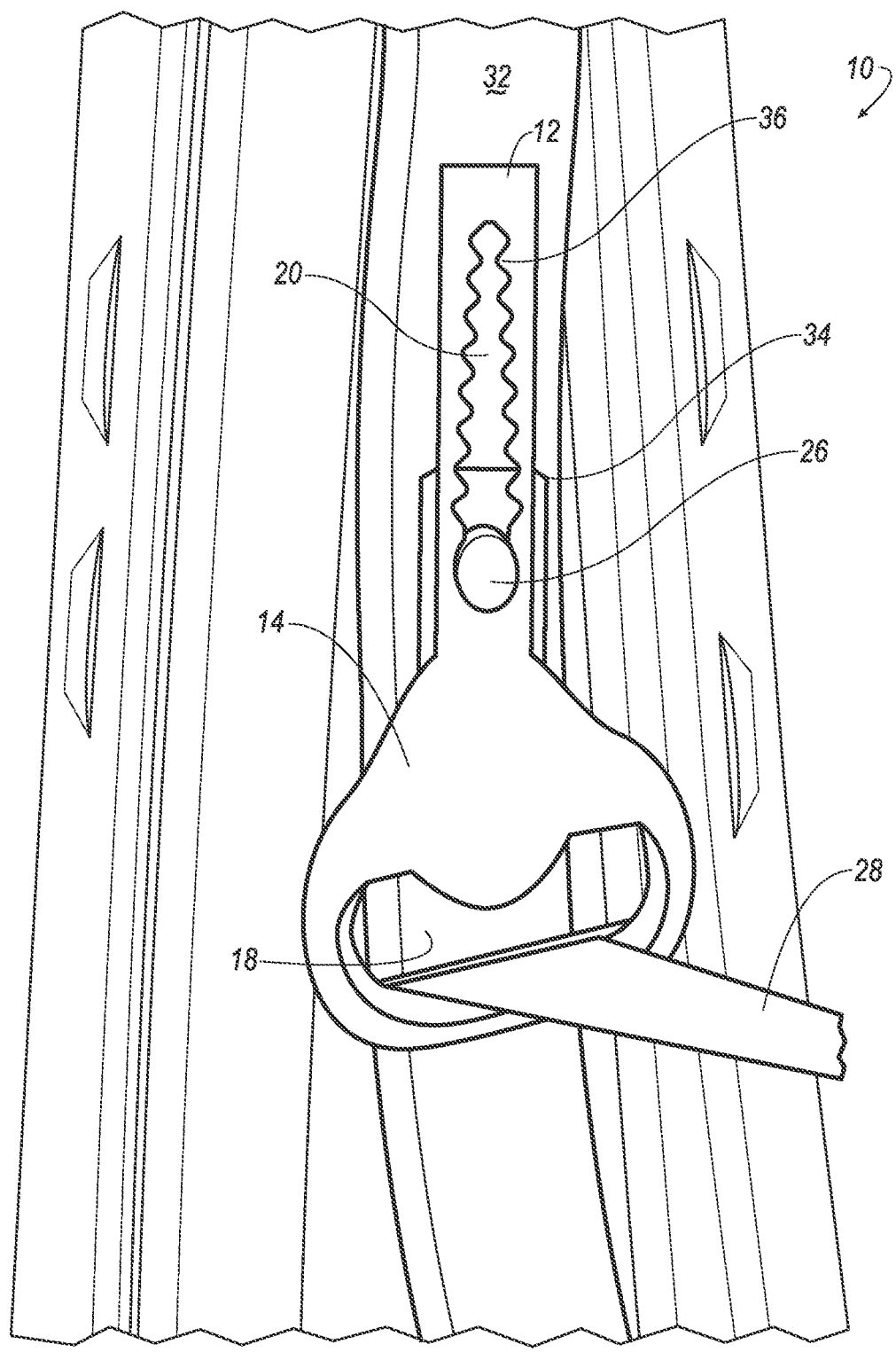
FIG. 1A is a view of a first example of a seat-belt mounting system in an unloaded state.

FIG. 1A provides a perspective view of a seat-belt mounting system 10 that includes a mounting plate 12 and a ring member 14. The mounting plate 12 has at least one deformable opening 20. The mounting plate 12 may be constructed of a known material, e.g., steel, aluminum, etc. In a first example, the deformable opening 20 has toothed sides 36. FIG. 1A shows the apparatus 10 in an unloaded state.

The ring member 14 includes an opening 18, e.g., a slot of the like, arranged to allow a strap 28 there-through. The strap 28 may be, e.g., webbing for a vehicle seat belt. The ring member 14 is rotatably connected to the mounting plate 12 to allow adjustment of the strap 28.

The deformable opening 20 receives a securing member 26, e.g. a bolt. The securing member 26 connects the mounting plate 12 to a bracket 34. The securing member 26 is arranged in the deformable opening 20 to contact the toothed sides 36. The securing member 26 may be constructed of any suitable material, e.g. a metal.

The bracket 34 is attached to a vehicle pillar 32. The bracket 34 retains the mounting plate 12 with respect to the vehicle pillar 32. The bracket 34 may be constructed of a known material, e.g., a metal. During a crash event, the mounting plate 12 may slide, e.g., vertically downward, along the vehicle pillar 32.

Figure 1B:
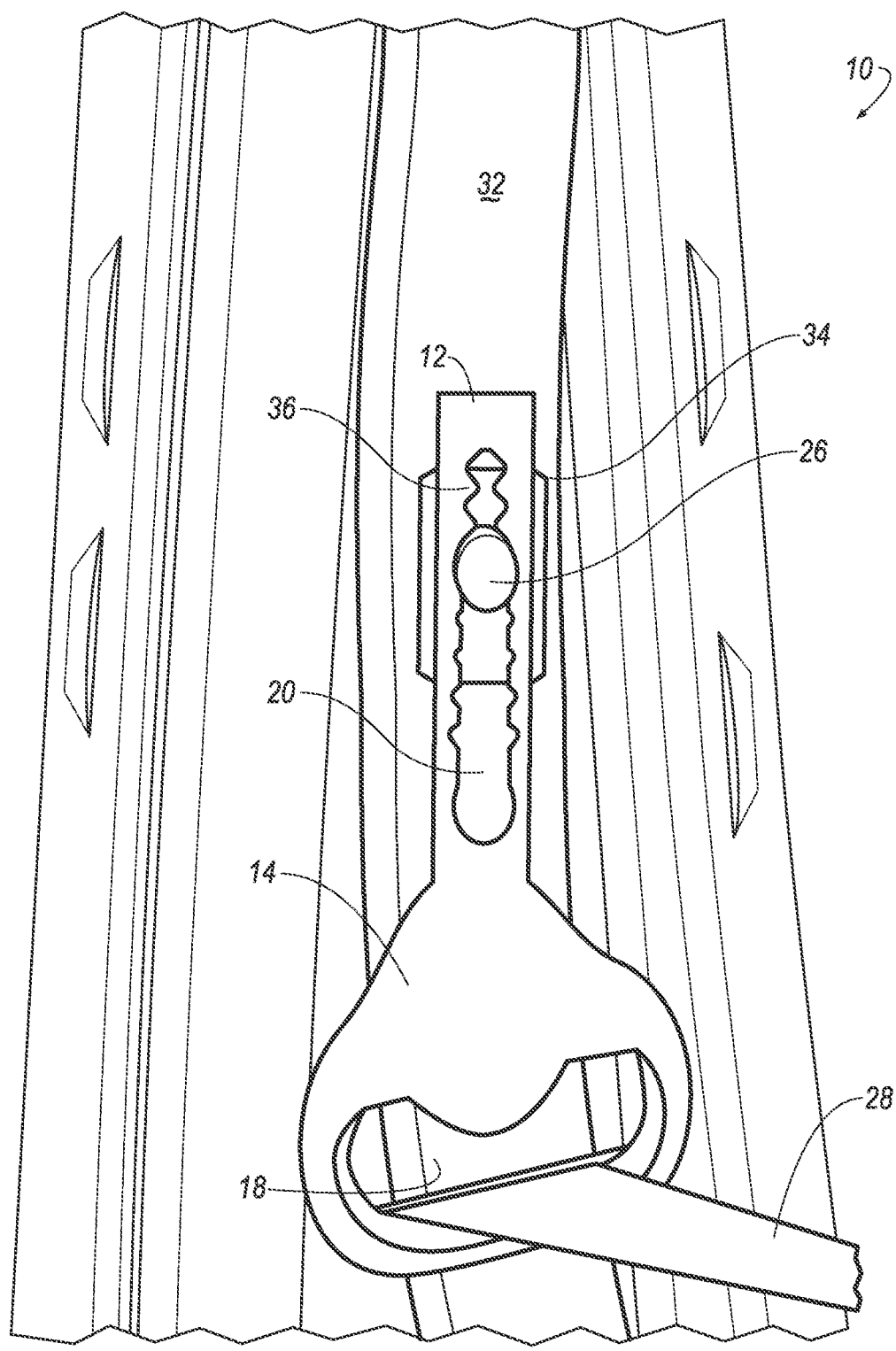
FIG. 1B is a view of the seat-belt mounting system of FIG. 1A in a loaded state.

FIG. 1B shows the system 10 of FIG. 1A in a loaded state. During a crash event, the strap 28 is typically pulled forward by an occupant's forward motion. The strap 28 pulls the ring member 14, rotating the ring member 14 in the direction of the occupant's motion, e.g., in a forward direction with respect to a longitudinal axis of a vehicle. The ring member 14 pulls the mounting plate 12, generally vertically downward with respect to the bracket 34 and pillar 32, which causes the toothed sides 36 of the deformable opening 20 to plastically and/or elastically deform. Accordingly, deformation of the toothed sides 36 absorbs crash energy from a vehicle occupant.

The mounting plate 12 may be designed to deform at a specific predetermined load. The predetermined load may be determined using computer-aided engineering (CAE) load simulation software or through crash testing. Specifically, CAE software may model various crash events based on vehicle geometry and occupant size to quantify loads to be absorbed. The mounting plate 12 may be designed to absorb, e.g., a 6-9 kilonewton (kN) load applied by an occupant during a crash event.

The mounting plate 12 may be constructed of a material, e.g. aluminum, that will deform upon application of the predetermined load. The deformable opening 20 and the toothed sides 36 are arranged to engage the securing member 26 so that application of a load on the plate 12, and movement of the opening 20 with respect to the securing member 26 causes deformation of toothed sides 36 to absorb the predetermined load.

Figure 2A:
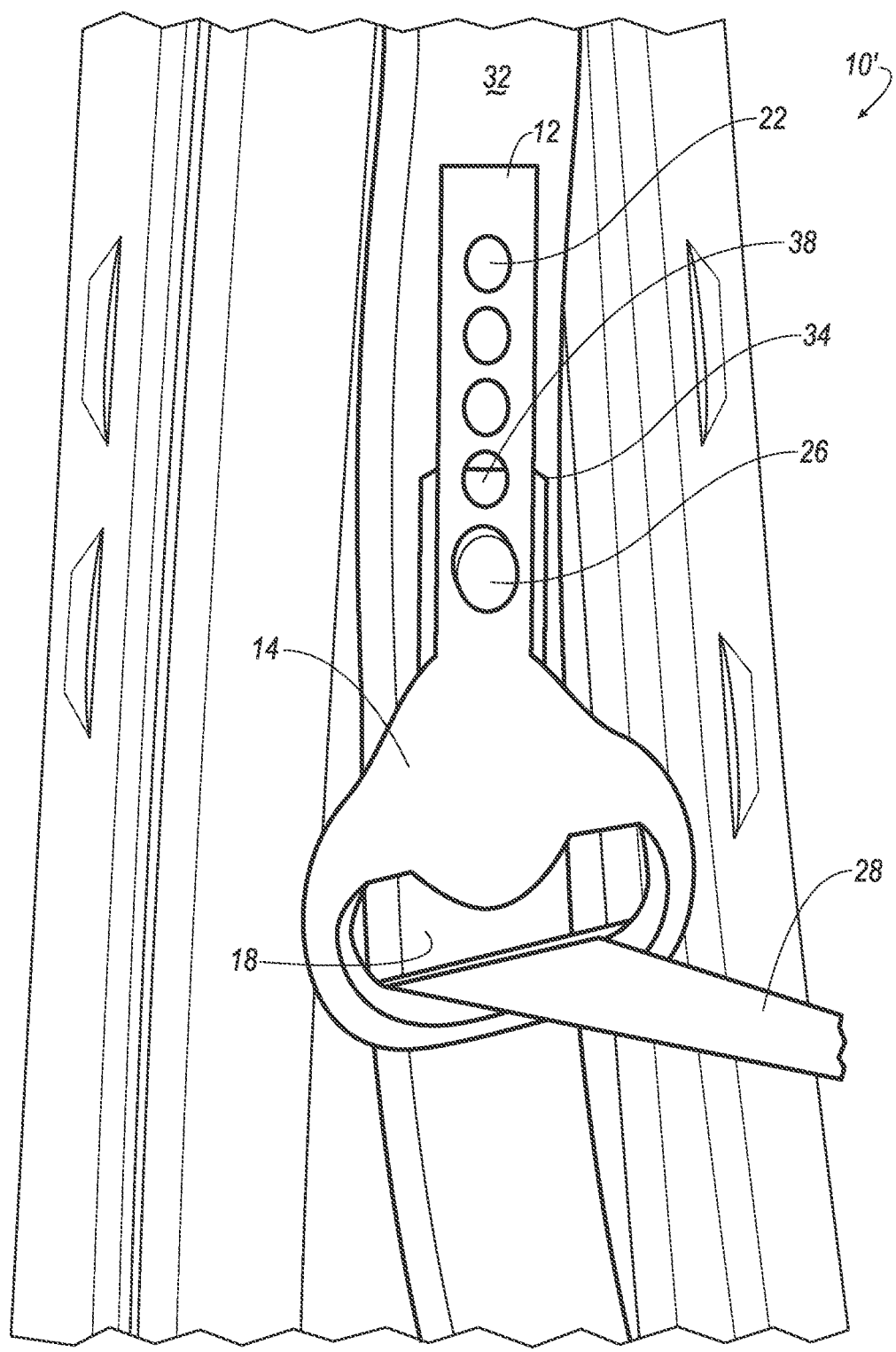
FIG. 2A is a view of a second example of a seat-belt mounting system in an unloaded state.

FIG. 2A shows a second example of a system 10' in an unloaded state. The mounting plate 12 includes a deformable retainer 22 including a plurality of openings 38. The openings 38 are configured to break upon applying a predetermined load. The openings 38 may be substantially circular and, in the unloaded state, one of the openings 38 may receive the securing member 26. The number of openings 38 may be adjustable depending on a predetermined load to be absorbed. Sizes of the openings 38 may be similar or vary along the mounting plate 12. Spacing and/or sizes of the openings 38 may be designed to accommodate a predetermined load that is desired to be accommodated.

Figure 2B:
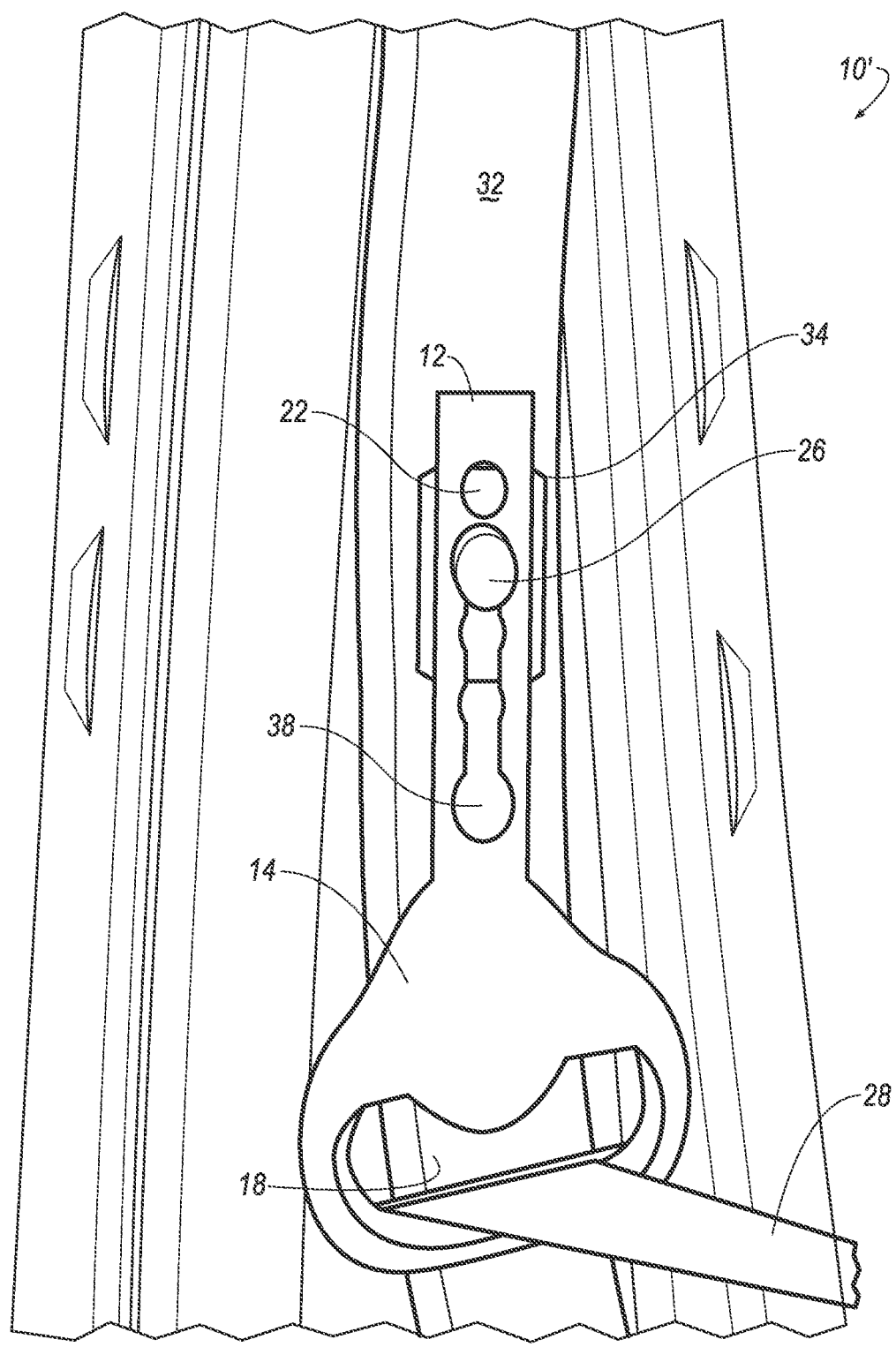
FIG. 2B is a view of the second example of the seat-belt mounting system of FIG. 2A in the loaded state.

FIG. 2B shows the second example system 10' in the loaded state. During a crash event, the ring member 14 rotates the mounting plate 12, e.g., in a direction of a vehicle occupant's forward motion. The securing member 26, which may be housed in the first of the plurality of openings 38, deforms the mounting plate 12 between the plurality of openings 38, causing one or more of the openings 38 to break. The breaking of the openings 38 (or, more precisely, or material in the plate 12 between openings 38) absorbs crash energy. Further, the deformable opening 22 may be constructed to absorb the predetermined load. The openings may be arranged substantially in a line so that when the ring member 14 and the mounting plate 12 rotate, the openings 38 are substantially aligned with the direction of the predetermined load.

Figure 3A:
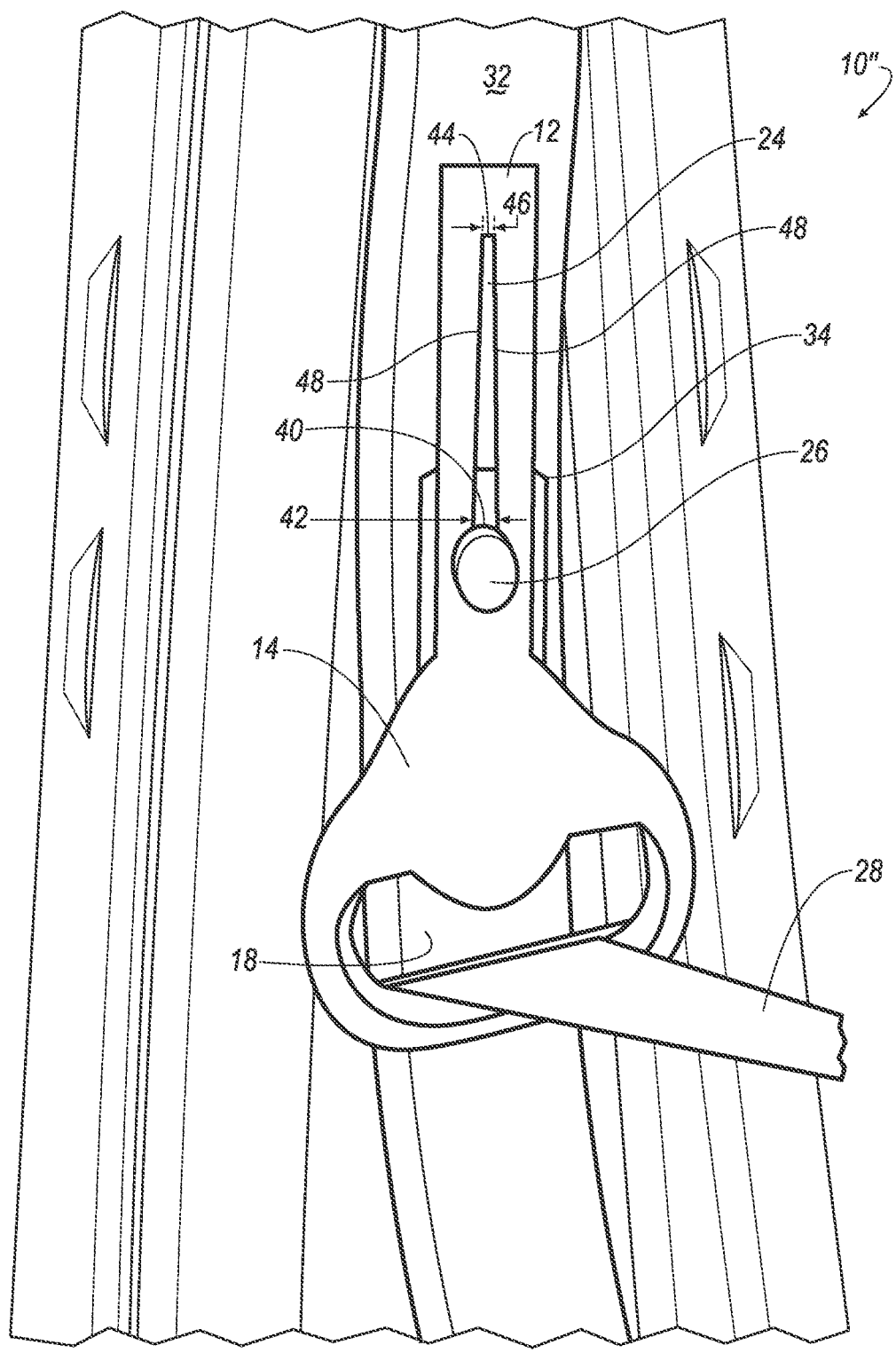
FIG. 3A is a view of a third example of a seat-belt mounting system the unloaded state.

FIG. 3A shows a third example of an apparatus 10" in the unloaded state. The mounting plate 12 in this example includes a deformable opening 24. The deformable opening has a first end 40, a second end 44, and substantially straight sides 48 between the first end 40 and the second end 44. The first end 40 has a first width 42, the first width 42 being a first distance between the sides 48 at the first end 40 in the unloaded state. The second end 44 has a second width 46 being a second distance between the sides 48 at the second end 44 in the unloaded state. The first width 42 may be greater than the second width 46, e.g., the width of the deformable opening 24 may gradually decrease from the first end 40 to the second end 44. The dimensions of the first width 42 and the second width 46 may be provided to accommodate specific deformation characteristics and to sustain specific loads.

The securing member 26 may be housed in the mounting plate 12 in communication with the first end 40, the first width 42 being smaller than the width of the securing member 26 to prevent the mounting plate 12 from moving relative to the securing member 26 in the unloaded state.

Figure 3B:
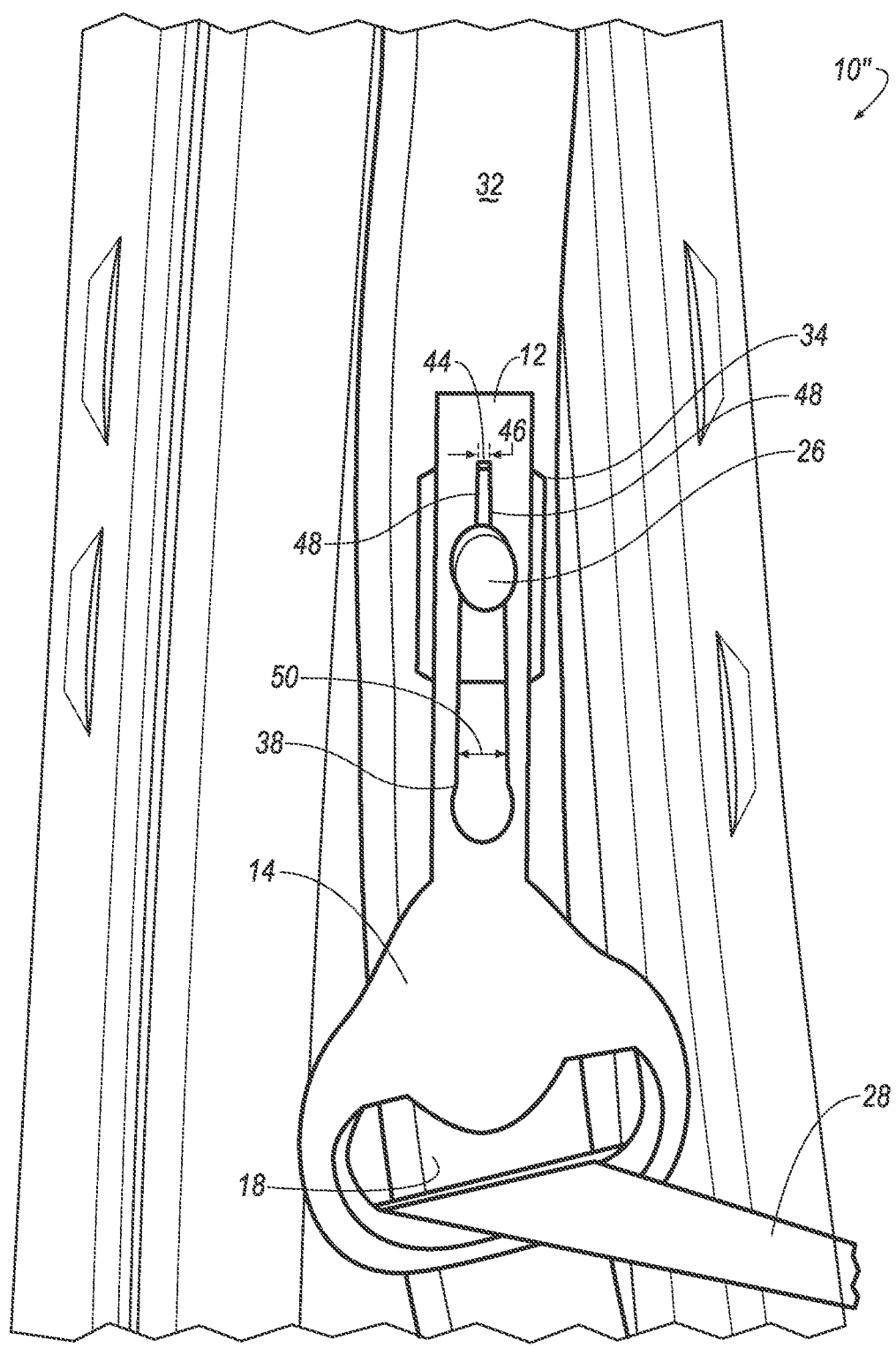
FIG. 3B is a view of the third example of the seat-belt mounting system of FIG. 3A in the loaded state.

FIG. 3B shows the third example of the apparatus 10" in the loaded state. During a crash event, the ring member 14 pulls the mounting plate 12 along the securing member 26, deforming the deformable opening 24. Specifically, as the securing member 26 engages the first end 40, the securing member 26 deforms the first end 40 by pushing the sides 48, increasing the width between the sides 48 to a deformed width 50. Because the width of the deformable opening 24 is smaller than the diameter of the securing member 26, expanding the width of the deformable opening 24 at the engagement point of the securing member 26 to the deformed width 50 by plastic and elastic deformation absorbs crash energy.

Figure 4A:
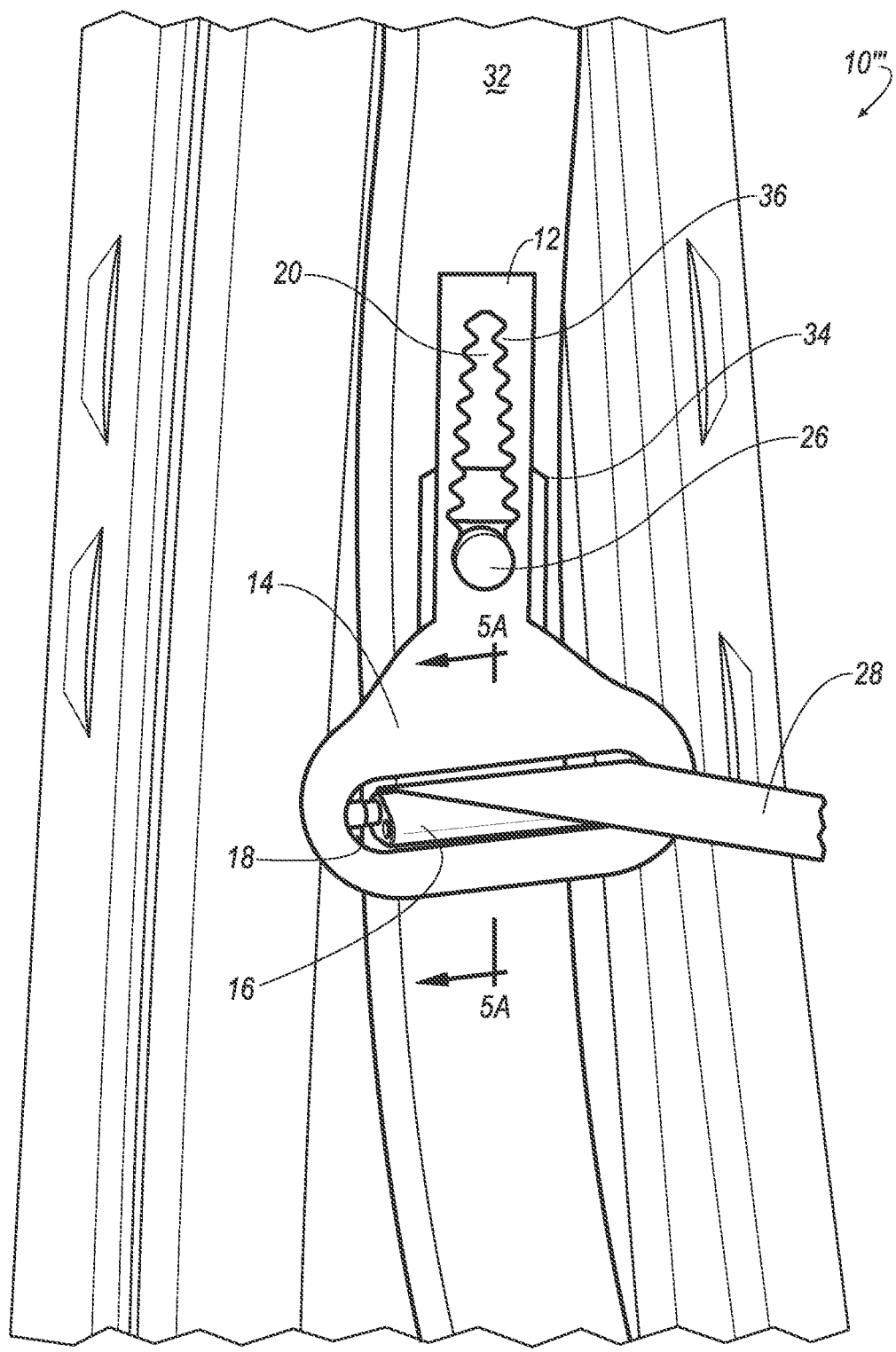
FIG. 4A is a view of a fourth example of a seat-belt mounting system with a locking mechanism in the unloaded state.

FIG. 4A shows a fourth example of an apparatus 10' in the unloaded state. The apparatus 10''' includes a locking mechanism 16 installed in the opening 18 of the ring member 14. The locking mechanism 16 may be a locking cam. The locking mechanism 16 may be constructed of a known material, e.g., a metal or rigid polymer, etc. The locking mechanism 16 is typically rotatably installed in the opening 18. In the unloaded state, the locking mechanism 16 is arranged to allow the strap 28 to move through the opening 18.

Figure 4B:
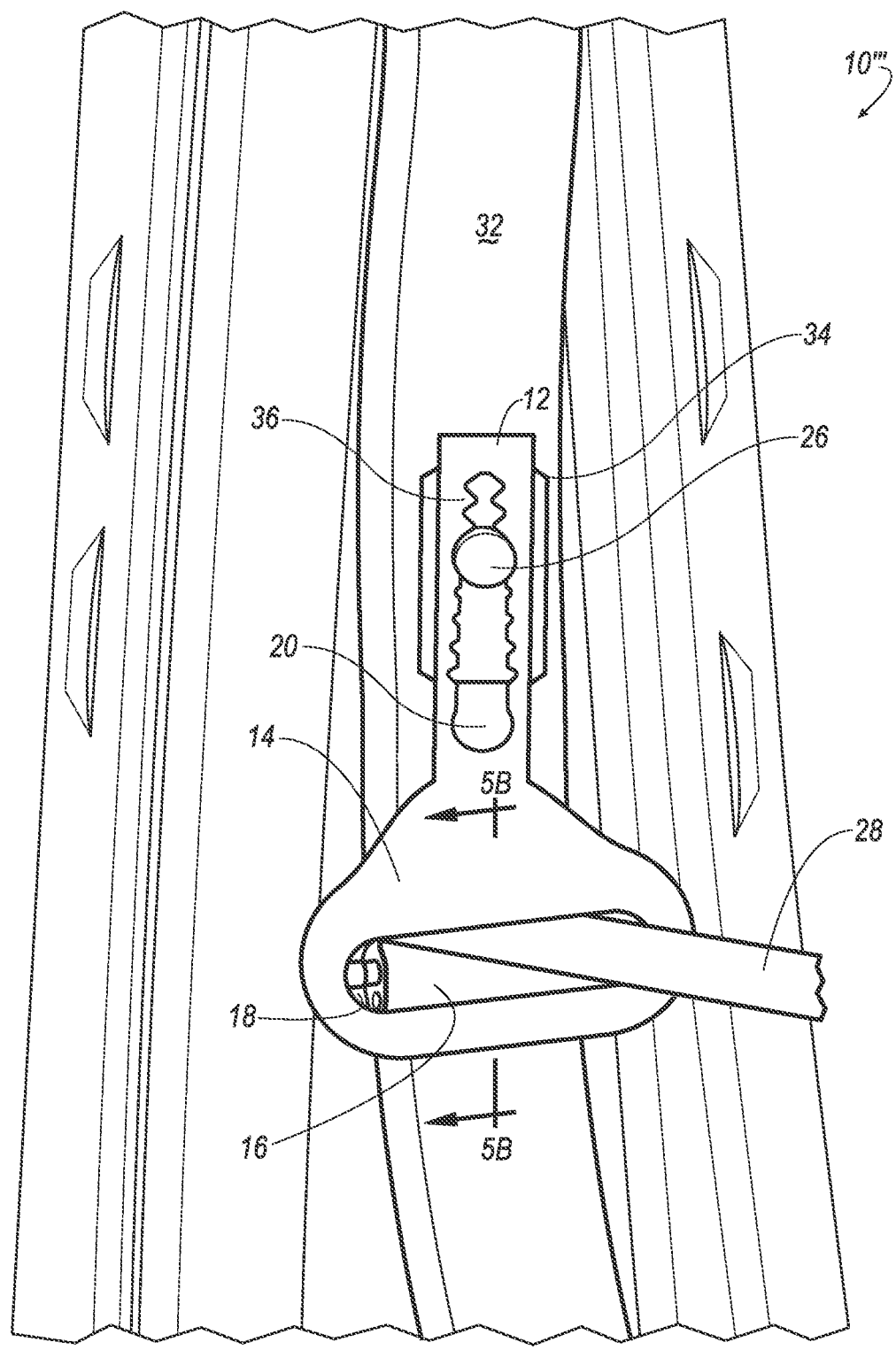
FIG. 4B is a view of the fourth example of the seat-belt mounting system of FIG. 4A with the locking mechanism in the loaded state.

FIG. 4B shows the apparatus 10''' in the loaded state. During a crash event, the locking mechanism 16 rotates a predetermined angle, e.g. 20-40 degrees relative to the position of the locking mechanism 16, in the unloaded state. The locking mechanism 16 locks the strap 28 against the ring member 14.

Figure 5A:
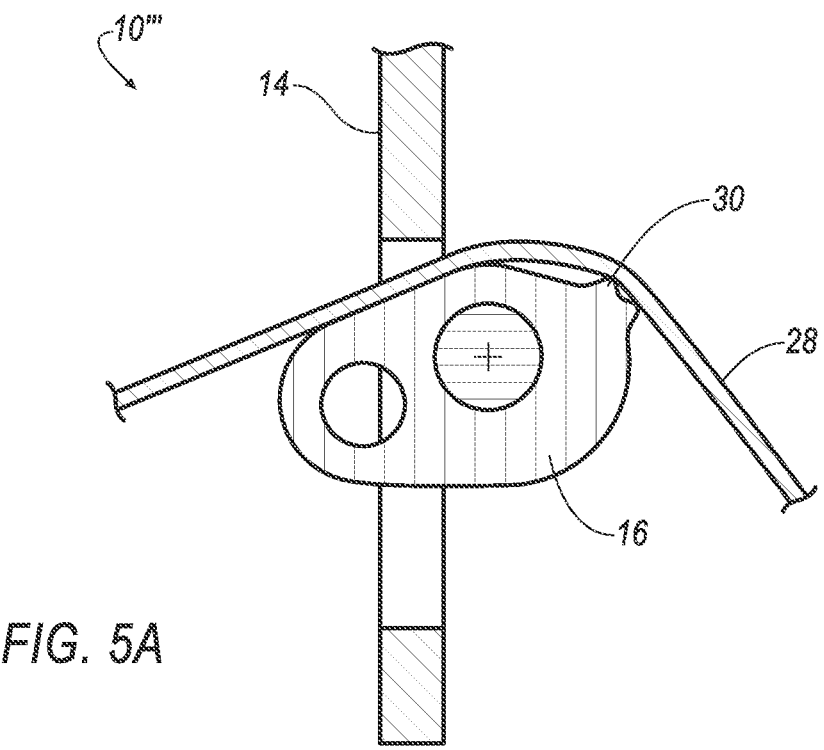
FIG. 5A is a side cross-sectional view of the fourth example of the seat-belt mounting system of FIG. 4A in the unloaded state.

FIG. 5A shows a side cross-sectional view of the apparatus 10''' along the line 5A in FIG. 4A. The apparatus 10''' is in the unloaded state. The ring member 14 provides a space in the opening 18 such that the strap 28 can be threaded over, i.e., partly around, the locking mechanism 16. The locking mechanism 16 may have longitudinal ridges 30 protruding out from and extending along the locking mechanism 16. The ridges 30 can engage the strap 28 when the locking mechanism is rotated in the opening 18, thereby more securely locking the strap 28 and preventing further payout of the strap 28 when the locking mechanism 16 is engaged.

Figure 5B:
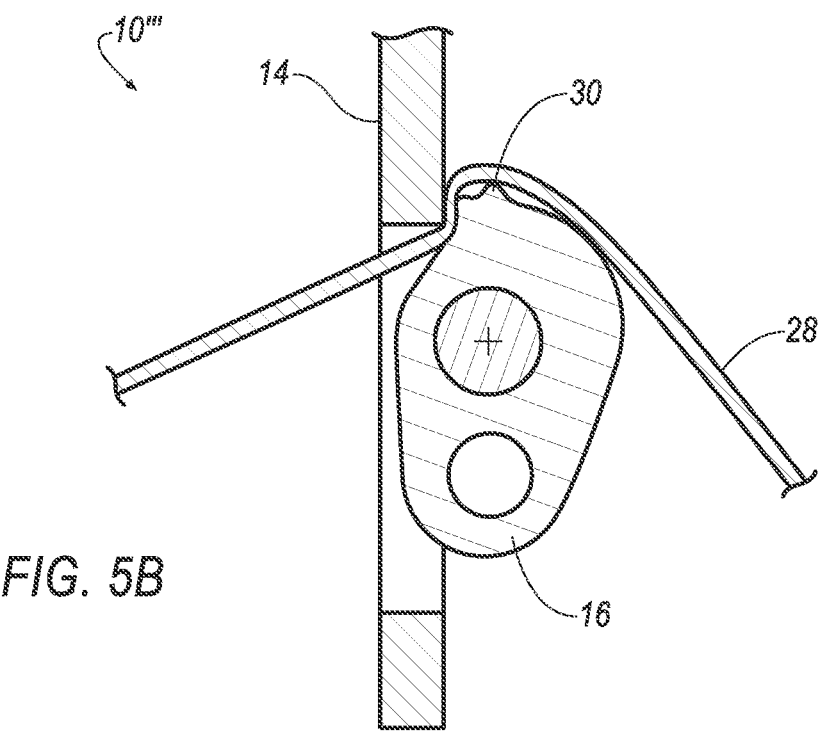
FIG. 5B is a side cross-sectional view of the fourth example of the seat-belt mounting system of FIG. 4B in the loaded state.

FIG. 5B shows a side cross-sectional view of the apparatus 10''' along the line 5B in FIG. 4B. The apparatus 10''' is shown in the loaded state in FIG. 5B. in the loaded state, the locking mechanism 16 may be engaged to restrain the strap 28 against the ring member 14. As seen in FIG. 5B, the locking mechanism 16 is rotated in the opening 18 relative to the position of the locking mechanism 16 seen in FIG. 5A (showing the unloaded state). Rotation of the locking mechanism 16 in the opening 18 causes the longitudinal ridges 30 to contact the strap 28 at a location where the strap 28 contacts the ring member 14. The locking mechanism restrains the strap 28 against the ring member 14, preventing movement of the strap 28, e.g., further payout, during a crash event.

In a conventional occupant restraint system, a retractor may be used to stop movement of the strap 28 during a crash event. However, the strap 28 may have residual slack, which allows the occupant to move forward. To restrain this slack, a pretensioner is typically installed to prevent the strap 28 from moving. The locking mechanism 16 may take the place of a pretensioner, preventing the slack from allowing the strap 28 to move by locking the strap 28 against the ring member 14.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An apparatus, comprising:
   a mounting plate having at least one deformable opening arranged to receive a securing member;
   a ring member defining an enclosed ring connected to the mounting plate, the ring member including an opening to receive a strap there-through; and
   a locking mechanism including a shaft extending from a first side of the ring member to an opposing second side of the ring member in the opening and a longitudinal ridge, the locking mechanism rotatable about the shaft in the opening to a loaded state in which the strap is locked between the ring member and the longitudinal ridge;
   wherein the at least one deformable opening is configured to deform when, after the locking mechanism is in the loaded state, a load on the mounting plate exceeds a predetermined threshold.

2. The apparatus of claim 1, wherein the securing member is a mounting bolt.

3. The apparatus of claim 1, wherein the at least one deformable opening includes toothed sides.

4. The apparatus of claim 1, wherein the at least one deformable opening is provided with two substantially straight sides, a first width at a first end of the deformable opening being greater than a second width at a second end of the deformable opening.

5. The apparatus of claim 1, wherein the ring member is rotatably connected to the mounting plate.

6. The apparatus of claim 1, further comprising a bracket mountable on a vehicle pillar and configured to slidably retain the mounting plate.

7. The apparatus of claim 1, wherein the strap is webbing for a vehicle seat belt.

8. The system of claim 1, wherein the locking mechanism is arranged to rotate about an axis defining a nonzero angle with a line of deformation of the mounting plate.

9. The apparatus of claim 1, wherein the locking mechanism is an elongated locking cam rotatably installed in the opening.

10. The apparatus of claim 9, wherein the cam is provided with a plurality of longitudinal ridges.

11. The apparatus of claim 10, wherein the longitudinal ridges are arranged to restrain the strap against the ring member during a vehicle impact.

12. The apparatus of claim 1, wherein the at least one deformable opening includes a plurality of openings configured to break on application of a predetermined load.

13. The apparatus of claim 12, wherein each of the plurality of openings is substantially circular.

14. A seat-belt mounting system, comprising:
   a mounting plate having at least one deformable opening arranged to receive a mounting bolt;

a bracket mountable on a vehicle pillar and configured to slidably retain the mounting plate;

a ring member defining an enclosed ring rotatably connected to the mounting plate, the ring member including an opening to receive a strap there-through; and a locking cam including a shaft extending from a first side of the ring member to an opposing second side of the ring member in the opening and a longitudinal ridge, the locking cam rotatable to a loaded state in which the strap is locked between the ring member and the longitudinal ridge;

wherein the at least one deformable opening is configured to deform when, after the locking cam is in the loaded state, a load on the mounting plate exceeds a predetermined threshold.

15. The system of claim 14, wherein the at least one deformable opening includes toothed sides.

16. The system of claim 14, wherein the at least one deformable opening is provided with two substantially straight sides, a first width at a first end of the at least one deformable opening being greater than a second width at a second end of the at least one deformable opening.

17. The system of claim 14, wherein the longitudinal ridge is arranged to restrain the strap against the ring member during a vehicle impact.

18. The system of claim 14, wherein the locking cam is arranged to rotate about an axis defining a nonzero angle with a line of deformation of the mounting plate.

19. The system of claim 14, wherein the at least one deformable opening includes a plurality of openings configured to break on application of a predetermined load.

20. The system of claim 19, wherein each of the plurality of openings is substantially circular.

* * * * *